(12) United States Patent
Fulton

(10) Patent No.: US 6,393,298 B1
(45) Date of Patent: May 21, 2002

(54) SYSTEM FOR THE EFFICIENT RE-USE OF MOBILE IDENTIFICATION NUMBERS WITH STATIONARY CELLULAR APPLICATION

(75) Inventor: Robert D. Fulton, Olathe, KS (US)

(73) Assignee: LaBarge, Inc., St. Louis, MO (US)

( * ) Notice: Subject to any disclaimer, the term of this patent is extended or adjusted under 35 U.S.C. 154(b) by 0 days.

(21) Appl. No.: 09/329,428

(22) Filed: Jun. 10, 1999

Related U.S. Application Data
(60) Provisional application No. 60/088,890, filed on Jun. 11, 1998.

(51) Int. Cl.[7] .................................................. H04B 1/38
(52) U.S. Cl. ........................................ 455/551; 455/419
(58) Field of Search ........................... 455/551, 550, 455/552, 553, 418, 419, 420, 432, 433, 435, 422

(56) References Cited

U.S. PATENT DOCUMENTS

| | | | |
|---|---|---|---|
| 5,572,571 A | * 11/1996 | Shirai | 455/551 |
| 5,603,084 A | * 2/1997 | Henry, Jr. et al. | 455/551 |
| 5,675,371 A | 10/1997 | Barringer | 348/6 |
| 5,918,172 A | * 6/1999 | Saunders et al. | 455/404 |
| 5,943,614 A | * 8/1999 | Obayashi et al. | 455/411 |
| 5,956,636 A | * 9/1999 | Lipsit | 455/411 |
| 5,978,669 A | * 11/1999 | Sanmugam | 455/410 |

* cited by examiner

Primary Examiner—Vivian Chin
Assistant Examiner—Duc Nguyen
(74) Attorney, Agent, or Firm—Armstrong Teasdale LLP

(57) ABSTRACT

In stationary or generally stationary devices that utilize the cellular network as a wireless front-end to another data network and that are involved strictly in machine-to-machine communication activities, a system is provided that supports the re-use of MINs between cellular markets. The system may also be used in other types of networks. A remote device, such as, for example, a cellemetry modem, communicates a commissioning request to a host system that has an associated system identifier (SID). The commissioning request includes a unique serial number (S/N) assigned to the remote device and an initial mobile identification number (MIN). If the remote device has not previously been commissioned, a temporary MIN from a list of predetermined temporary MINs is transmitted; otherwise, a previously assigned permanent MIN is transmitted. If necessary, the host system transmits a permanent MIN (or a new permanent MIN) selected from a list of available MINs associated with the host system's SID to the remote device. The transmitted MIN is thereafter used by the remote device to access the host system, until the remote device is moved from that host system or removed from service. The host system is also in communication with a remote device database, which maintains a table of S/Ns and associated SIDs and MINs. The effective use of S/Ns in the commissioning process allows MINs to be reused in different host systems. Furthermore, the use of a remote device database allows MINs assigned to remote devices that have moved or taken out of service to be reclaimed for reuse.

47 Claims, 3 Drawing Sheets

SYSTEM FOR THE EFFICIENT RE-USE OF MOBILE IDENTIFICATION NUMBERS WITH STATIONARY CELLULAR APPLICATION

CROSS-REFERENCE TO RELATED APPLICATION

This application claims the benefit of U.S. Provisional Application No. 60/088,890, filed Jun. 11, 1998.

BACKGROUND OF THE INVENTION

This invention relates generally to the allocation of mobile identification numbers (MIN) and, more particularly, to a system in which MINs are re-used efficiently in a cellular or wireless application environment.

The North American Cellular Network provides a ubiquitous wireless communication network designed to serve the needs of wireless voice communications. ANSI/EIA/TIA-552-1989, the Electronic Industries Association's specification "Mobile Station-Land Station Compatibility Specification" describes the technical requirements for a mobile station to ensure compatibility and the ability to obtain service in any Advanced Mobile Telephone System (AMPS) cellular system. This specification formalizes basic radio requirements (modulation-type, frequency range and stability, output power) call processing procedures, and the format of messages transferred between land and mobile stations for the system currently deployed throughout North America.

Each AMPS mobile telephone has two values associated with it: a MIN and an Electronic Serial Number (ESN). The ESN is a 32-bit value programmed into the telephones's internal software at the factory and is not adjustable. The MIN is a standard 10-digit telephone number assigned by the cellular carrier associated with a specific ESN when the telephone is sold or activated. The AMPS specification provides for a globally unique, 10-digit MIN to be associated with every mobile communication device using the system. The MIN global identifiers are managed according to the Numbering Plan Area (NPA) and individually administered by the various cellular carriers. The number space of nearly 1,000,000,000 numbers is allocated by the NPA governing body in blocks to the interested parties, such as telephone companies and cellular providers. When a mobile call is made, the cellular telephone transmits its MIN and ESN to identify itself to the cellular system for billing purposes. The use of a 10-digit MIN to identify a mobile communication device has several key advantages for voice applications, such as: (1) there is no conflict with addresses used by traditional, switched circuit telephone services; (2) mobile communication devices are addressable from wired telephone services using standard dialing methods; and (3) global uniqueness permits mobile devices to "roam" and be identified outside their "home" coverage area, which roaming feature is an integral feature of the AMPS cellular telephone network.

In addition to telephone service, AMPS also provides another service for the communication of small packets of data. This service is typically used for communication of data from remote, wireless devices to a customer's facility. Also, several commercial services provide access to the cellular network infrastructure as a wireless front-end to another data network. Such access includes cellular digital packet data (CDPD), several forms of control channel messaging, and short messaging services. In many cases, these technologies are utilized in applications that are deployed only in fixed, stationary locations. These devices typically are infrequently moved, and thereby do not require temporary roaming capability. Also, these devices are commonly involved in strictly machine-to-machine communication activities, thus eliminating the requirement that the communication device be addressed directly from switched circuit telephone services. Therefore, in many cases, such devices are assigned MINs that cannot be addressed directly from standard telephone devices.

With increasing numbers of cellular telephones, pagers, machine-to-machine communication devices, and even the increasing number of families having more than one telephone line, MIN space is becoming a scarce commodity. For communication devices that do not roam and do not need to be generally addressable by each device in the public network, there is at least a possibility that the MINs assigned to them could be reused in different cellular systems. Therefore, the practice of assigning globally unique identifiers to stationary or generally stationary communication devices is an inefficient use of MIN space.

In view of the wastefulness of providing unique MINs for stationary or generally stationary devices generally operating within a single system, a method for assigning MINs to such devices that permits efficient reuse of the assigned MINs between different systems would be advantageous and desirable. Because of restrictions imposed by carriers on amounts of data that may be communicated to and from devices such as cellemetry modems, it would also be desirable if such a method provided efficient and error-resistant assignment of MINs to remote units. It would also be desirable to provide a method for reclaiming of previously assigned MINs as the assigned device is taken out of service, or out of the service area of a particular system.

BRIEF SUMMARY OF THE INVENTION

The present invention, in one aspect, is a system and corresponding method supporting the re-use, between cellular systems, of MINs assigned to stationary or generally stationary devices. Such devices, for example, utilize a cellular network as a wireless front-end to another data network and are involved in machine-to-machine communication activities. The system and method are also applicable to other types of networks. A stationary or generally stationary device, e.g., a remote device such as a cellemetry modem, communicates a commissioning request to a host system that has an associated system identifier (SID). The commissioning request includes a unique serial number (S/N) assigned to the remote device and an initial mobile identification number (MIN). If the remote device has not previously been commissioned, a temporary MIN from a list of predetermined temporary MINs is transmitted; otherwise, a previously assigned permanent MIN is transmitted. If necessary, the host system transmits a permanent MIN (or a new permanent MIN) selected from a list of available MINs associated with the host system's SID to the remote device. The transmitted MIN is thereafter used by the remote device to access the host system, until the remote device is moved from that host system or removed from service. The host system is also in communication with a remote device database, which maintains a table of S/Ns and associated SIDs and MINs.

In another aspect of the invention, the invention comprises a remote device for communicating with a host system and a corresponding method of operating the remote device. The remote device communicates a commissioning request to a host system identified by a SID. The remote device then receives a permanent MIN from the host system, stores it in a memory of the remote device, and thereafter uses the permanent MIN to identify the remote device in communications with the host system. Use of the permanent MIN may continue until the remote device is decommissioned or moved to a different area.

In another aspect of the invention, the invention comprises a method of operating a host system associated with a SID to communicate a permanent MIN to a remote device. The host system receives a commissioning request from a remote device, selects a permanent MIN from a database of available MINs associated with the host system's SID, and communicates the permanent MIN to the remote device.

In another aspect of the invention, the invention comprises a method for re-allocating previously allocated MINs by storing a tabulation of MINs by SIDs in an available MIN database table managed with a host system. Information on at least one individual remote device is stored in a remote device database table managed by a host system. This information includes at least a currently assigned MIN, a last registered SID, an equipment serial number (ESN) and a last known switching center. Information on a MIN an ESN and a SID are received by the host system and compared with information in the remote device database table. Stored MIN and SID entries in the remote device database table are erased, and the erased information is added to the available MIN database table when the received SID information is different from the stored SID information. If the stored SID information is identical to the received SID information, the existing MIN information is preserved.

In another aspect of the invention, the invention comprises a method of establishing contact with a host system from a remote cellular device. A fixed block of temporary MINs is stored in non-volatile memory in a remote cellular device. In addition, a MIN is randomly selected and used to contact a system host.

In another aspect of the invention, the invention comprises a method of compressing data representing an assigned MIN. The method comprises establishing a base MIN, assigning a MIN, and encoding a difference between the assigned MIN and the base MIN on a digit-by-digit basis using a tuple, with one position of the tuple representing a digit difference and another position of the tuple representing a position difference.

The above described system provides for efficient reuse of MINs in conjunction with different host systems. In addition, MINs assigned to remote devices that have moved or taken out of service are efficiently reclaimed for reuse.

DETAILED DESCRIPTION OF THE INVENTION

Figure 1:
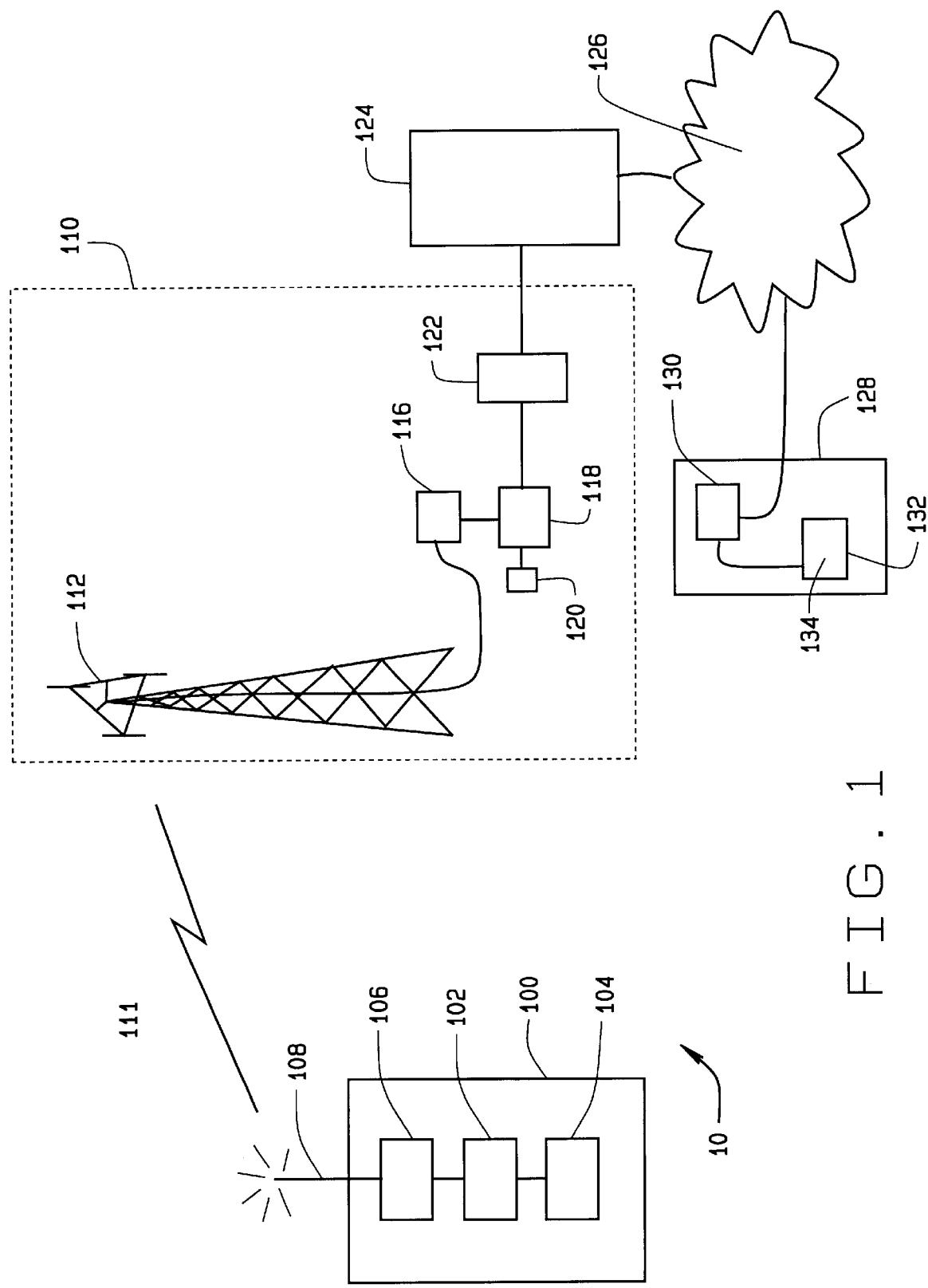
FIG. 1 is a simplified block diagram of a remote device communicating with a host system and an equipment database in the system of the present invention.

The simplified block diagram of FIG. 1 represents one embodiment of a communication system 10 in an AMPS cellular environment. The present invention, with appropriate modifications, is also applicable to other types of environments, including other wireless communication environments and even, in appropriate instances, wired networks.

A remote device is represented as 100 in FIG. 1. Typically, other remote devices are also present and operating in system 10, but these other remote devices are not shown in FIG. 1. In one embodiment, remote device 100 includes a processor 102 and a memory 104, for example, a nonvolatile memory. Interconnections that may be necessary for routine operation of the remote device other than those used in the practice of this invention are not shown. Processor 102, via a cellular transceiver 106 and an antenna 108, communicates to a host system 110. Communication is bidirectional, via a radio link 111 in the illustrated embodiment. In one embodiment, remote device 100 is stationary, or at least generally stationary, in contrast to standard portable or mobile cellular telephones. Memory 104 in remote device 100 includes a predetermined list of temporary MINs. In addition, memory 104 has the capability of storing a permanently assigned MIN, and may also store the SID associated with host system 110 and an identification of a switching station 124 that services host system 110. A unique serial number (S/N) is also stored in remote device 100, for example, in memory 104. The unique serial number may be an ESN assigned by a regulatory agency. However, it will be understood that a set of unique serial numbers assigned by a manufacturer or licensee may be used consistently in place of an ESN in an embodiment of the invention. The set of serial numbers assigned by the manufacturer or licensee may be smaller than the set of ESNs assigned by the regulatory agency.

In one embodiment, host system 110 includes an antenna 112 and a transceiver 116 configured to transmit and receive signals via radio link 111. Host system 110 further includes a processor 118 coupled to a memory 120. Memory 120 contains a database of assignable MINs associated with the SID of host system 110. Alternately, the database of assignable MINs associated with the SID may be maintained elsewhere and be made accessible to host system 110, particularly if the SID is shared by other host systems (not shown). For example, the database of assignable MINs associated with the SID could be maintained at a central computer that is accessible by host system 110. Processor 118 communicates to remote devices including remote device 110 via transceiver 116, and also communicates, via a network interface 122 and a switch 124, with a network 126. Network 126 may be a public data network or a public switched network or another suitable network. System 10 also includes a computing system 128 including a processor 130 and a memory 132 including an equipment, or remote device database 134. Computing system 128 communicates with processor 118 of host system 110 and with other processors of other host systems (not shown). A predefined reference MIN and a table of signaling MINs representing possible digit-by-digit differences between a specified MIN and the predefined reference MIN are also stored, both in a location accessible by host system 110, for example, in memory 120, and also in memory 104 of remote device 108.

For this description, it will be assumed that the predefined reference MIN is the lowest-numbered MIN in a block of MINs including the assignable MINs, because assignable MINs may be allocated in contiguous blocks. However, the predefined reference MIN could be an arbitrarily selected MIN known throughout system 10.

Remote device 100 may be of the class discussed in the '371 patent and is remotely located equipment which accesses wireless communication services provided by host system 110. Host system 110 is centrally located equipment with access to remote devices such as remote device 100 over the wireless communication services.

Host system 10 also includes a cellular market database table (not shown). This table is a database table managed by host system 110 that contains information relevant to cellular markets for which control channel messaging services are available. This information includes a SID associated with host system 110, a network access method, a market description, and an available MIN block assignment. The cellular market database table may be stored in memory 120 of host system 110.

The available MIN database is a database table managed by the host system that contains a tabulation of MINs by SID which have not yet been assigned or which have been reclaimed by relocating or removing of a communication device from service.

In one embodiment, the remote device database 134 is a database that is. managed by host system 110 and which is in communication with several host systems including host system 110 and separately managed, such as by an equipment manufacturer. Remote database 134 contains information relevant to the individual remote devices 100 using a given communication medium. This information includes a currently assigned MIN, if any, the last registered SID, if any, and ESN (or other uniquely assigned serial number, as described above).

Figure 2:
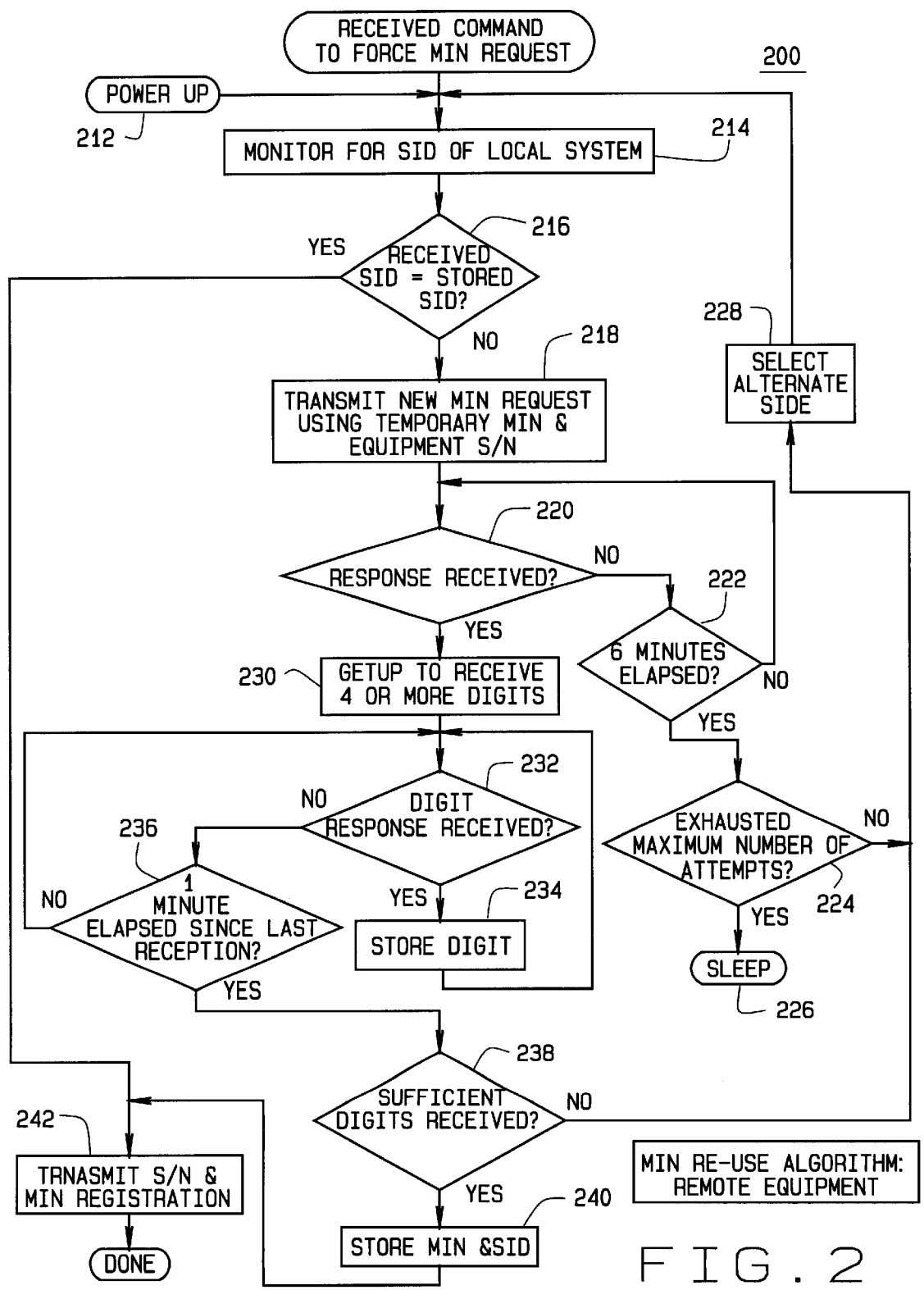
FIG. 2 illustrates a flowchart detailing the operation of a remote device in the system of the present invention.

In one embodiment and referring to FIG. 2, illustrating a flowchart 200 of the installation of a new remote device 100 in system 10. Remote device 100, upon activation or power up 212, monitors 214 and determines 216 whether the SID of the cellular carrier providing local service is different from the SID stored in non-volatile memory 104. Because remote device 100 has been newly installed, it is highly likely that remote device 100 will determine 216 that there is a difference between the received SID and the stored SID.

If there is a difference between the received SID and stored SID, remote device 100 randomly selects a temporary MIN from the reserved block of MINs stored in memory 104. The random selection may be based upon the ESN or other unique serial number associated with remote device 100. Remote device 100 then transmits 218 its unique ESN or other unique serial number through the wireless carrier using this temporary MIN as its address. This transmission may be understood by host system 110 as a new MIN request. The random selection feature is employed to reduce the possibility that two or more remote devices in a given market may simultaneous request a new MIN association.

Remote device 100 then waits 220 for a response from system host 110. In one embodiment, after a selected period of time has elapsed 222, for example, five minutes, remote device 100 determines whether a maximum number of attempts have been exhausted 224. If so, remote device 100 goes into a sleep mode 226. Sleep mode represents an error condition that, in one embodiment, requires, in order to exit, a manual reset of remote device 100. The manner in which the error condition is corrected is a design choice that is not considered part of the invention. If the maximum number of attempts has not been exhausted, an alternative side 228, i.e., in the case of AMPS, an alternate carrier, is selected, and the process of monitoring 14 is restarted.

In one embodiment, an assigned MIN is prepared for transmission by encoding the difference between the assigned MIN and a reference MIN on a digit-by-digit basis. In this embodiment, the reference MIN is the lowest possible MIN assignment recorded in the cellular market database table. The result is broadcast as a series of packets, each representing a unique tuple (digit 0–9, position 1–10). For example, Assigned MIN: 0041001307
Reference MIN: 0041000000
Tuples Communicated: (7,1) (3,3) (1,4)

The tuples communicated indicate that the assigned MIN differs from the reference MIN in digit positions 1, 3, and 4 (as counted from the right), and that digits in the assigned MIN are 7, 3, and 1 in those positions, respectively. Host system 110 echoes the temporary MIN, followed by the packets prepared for transmission above. In this embodiment, the packets used for transmission are themselves MINs from a reserved group of signaling MINs. Each of the signaling MINs has a preassigned correspondence to a tuple in the matrix of possible tuples. In the example above, MINs corresponding to the tuples (7,1), (3,3), and (1,4) are transmitted by host system 110 to remote device 100. A pause longer than a predetermined period without transmission of a signaling MIN indicates the end of the tuple broadcast. Remote device 100 decodes the signaling MIN broadcast to reconstruct the assigned MIN.

Blocks 220, 230, 232, 234, 236, 238, and 240 in FIG. 2 are directed to receiving and decoding the signaling MINs broadcast from host system 110. Upon receipt of the MIN corresponding to the temporary MIN transmitted 218 by remote device 100 earlier, remote device 100 switches 230 to a mode in which it is prepared to receive the signaling MINs. Specifically, remote device 100 receives and decodes the tuple-encoded packets containing its new MIN association. This value, along with the current SID is stored in non-volatile memory 104. As seen in FIG. 2, the receipt and decoding of the tuple-encoded packets occurs digit-by-digit in blocks 232, 234, 236 and 238. When a signaling MIN is received 232, the received signaling MIN is decoded and the digit and digit position indicated are stored 234. More digits and digit positions, represented by additional signaling MINs, may be received 232, and if so, these digits and digit positions are also stored 234. Eventually, all of the digit and digit position tuples will have been transmitted by host station 110, and a lapse 236, for example, one minute, will occur in the reception of signaling MINs. Lapse 236 is taken by remote device 100 as a termination of the transmission of differences between the reference MIN and the permanent MIN by host system 110. After termination of transmission 236 is determined, remote device 100 determines 238 whether a sufficient number of digits and digit positions have been received. Typically, the reference MIN is not assigned as a permanent MIN, so if at least one digit and digit position has not been received, an error is indicated. In this case, remote device 100 switches to an alternate side 228, i.e., switches to another cellular carrier, in a cellular market, and starts again as though a power up 212 had occurred. Otherwise, the assigned permanent MIN is decoded from the received digits and digit positions and the reference MIN, and the permanent MIN, as well as the SID associated with host system 10, are stored 240 in non-volatile memory.

Using the newly assigned, permanent MIN, the ESN is again transmitted at 242 to system host 110 as verification of the assignment. This process will be repeated periodically as a routine confirmation of the association.

Figure 3:
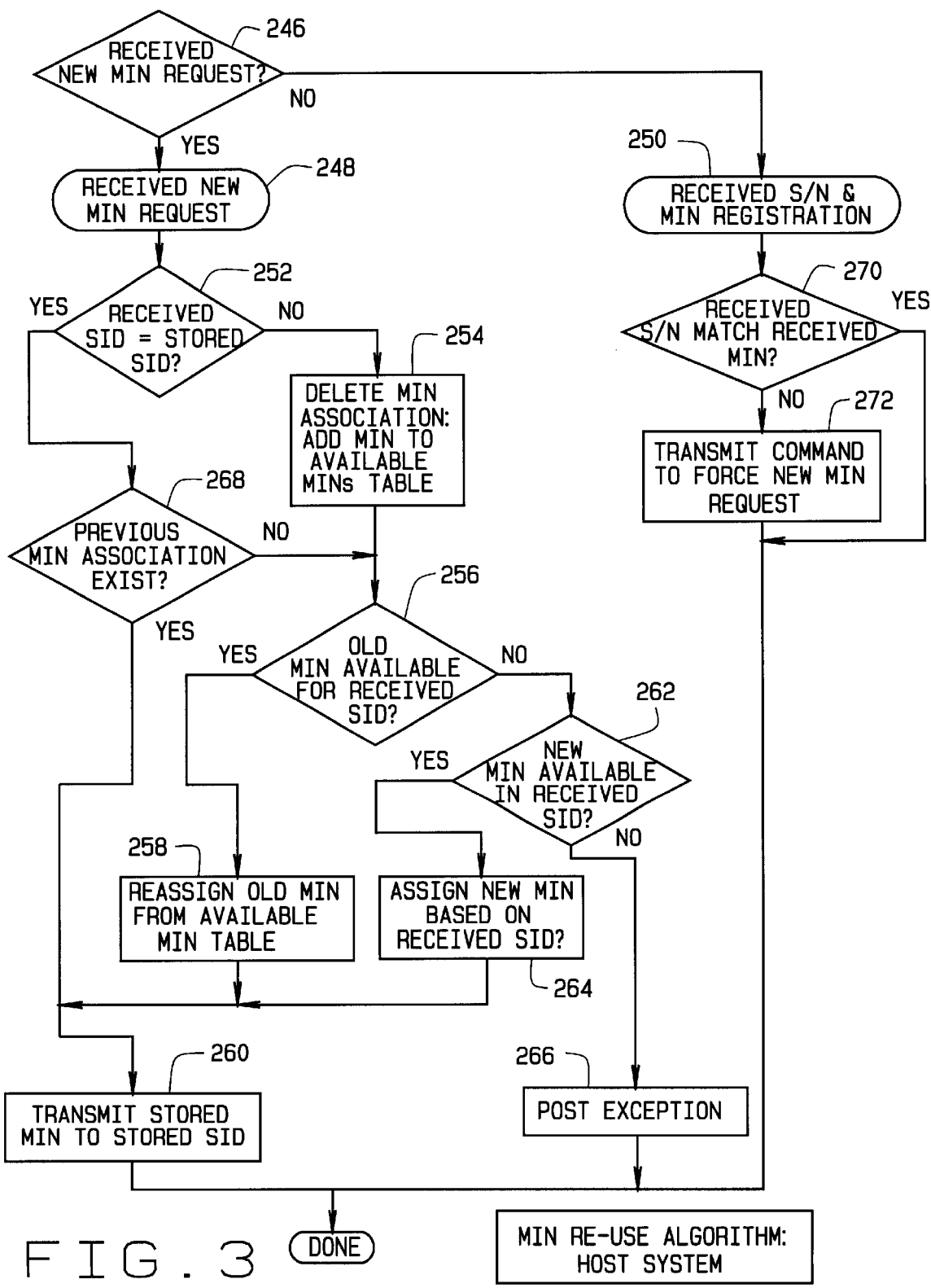
FIG. 3 illustrates a flowchart detailing the operation of a host system in the system of the present invention.

Corresponding actions are taken by host system 10 when a new MIN request is received. Referring to FIG. 3, host system 110 receives a new MIN request 256. Host system 110 differentiates 246 between a new MIN request 248 and a received serial number and MIN registration 250 depending upon whether one of the reserved, temporary MINs was used or a permanent MIN was used. When a temporary MIN is used, the transmission from remote device is considered a new MIN request 248. If the new SID and the existing SID entries are different 252, then the existing MIN and SID entries are erased 254 from the remote device database table and added to the available MIN database table, if applicable. Next, a determination 256 is made as to whether an old MIN is available for the received SID. If available, the old MIN is reassigned 258 from the available MIN table and this MIN is transmitted 260. If an old MIN is not available 256, it is determined 262 whether a new MIN is available for the received SID. If so, a new MIN is assigned based upon the received SID 264 and the result is transmitted. If the new MIN is not available 262, then an exception is posted 266.

When a new MIN is assigned 264 based on the new SID, a number of operations occur in this embodiment. First, the available MIN database table is checked for any entries containing the new SID and a MIN with the same sense as the ESN. If available, the MIN is reclaimed and removed from the available MIN database table. If not, another MIN, for example, the next higher MIN, is determined from all entries in the remote device database table operating in the new SID. This determination may be based upon the ESN. The result is compared to the maximum available MIN stored in the cellular market database table. If no assignments are currently in use in the new SID, the minimum available MIN stored in the cellular market database table is used. The assigned MIN is recorded in the remote device database table.

Upon receipt 250 of a permanent MIN and ESN from remote device 100, system host 110 verifies 270 the association between the SID, MIN and ESN at equipment database 134. If a discrepancy is found, a command packet is transmitted 272 to remote device 100, directing remote device 100 to re-commission itself This will have the effect of repeating the above process, as if remote device 100 had been first installed.

In one embodiment, after installation of remote device 100 as described above, remote device 100 is considered pre-existing. In this embodiment, when remote device 100 transmits 242 its ESN and MIN to host system 110, the transmission is received 250. System host 110, via equipment database 134, verifies 270 the association between the SID, MIN and ESN. If no discrepancy is found, the re-use and MIN assignment algorithms are not triggered. At this point, remote device 100 operates to provide the required information. In one application, remote device 100 may transmit information such as that disclosed in the '371 patent.

If remote device 100 is moved from one location to another, the SID of the cellular carrier providing local service may change. In this embodiment, remote device 100 determines 16 from transmission by host system 110 that the SID of the cellular carrier providing local service has changed from the SID which has been stored in non-volatile memory 104. At this point, the operation and the interaction between remote device 100 and host system 110 is essentially the same as that. described above.

Where remote device 100 is moved from one location to another, switch 124 that services host system 110 may change even if the SID of the cellular carrier does not. In some systems, host system 110 may not respond to a remote device 100 or a remote device may not respond to a host system unless each recognizes an identification number associated with switch 124. Remote device 100 may thus also be receptive to broadcasts of the identification number of switch 124 by host system 110 for storing this number in memory 104. This number may be used for transmission to host system 110 if required.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the construction and methods herein described and illustrated without departing from the scope of the invention, the matter contained in the foregoing description or shown in the accompanying drawings are to be interpreted as illustrative rather than limiting. Also, in the claims that follow, it will be understood that recitation of the communication of any item of information is intended to include communication of a signal indicative of such information, irrespective of how the information is encoded, encrypted, or modulated. Similarly, where storing, comparing, analyzing, or other operations are recited as being performed with any item of information, operations performed using representations of such information and having the same effect are also intended to be included. Those skilled in the art would also recognize the applicability of the invention to networks other than cellular networks. For example, such networks include other types of wireless networks, such as, specialized mobile radio systems (SMRs) and personal communication services networks (PCSs), and various types of wired networks. Thus, the terms "transceiver," "transmitter," and "receiver" should not be construed as being limited only to wireless transceivers, transmitters, and receivers unless otherwise specified, or unless required by the context in which the term appears.

In addition, the MINs, SIDs, and unique serial number (S/N) specified in the claims are not necessarily required to be the MINs of the specified in the AMPS specification, the SIDs assigned to wireless carriers, or the ESNs assigned by regulatory agencies to communication devices. Particularly in networks other than the AMPS network, MINs, SIDs and S/Ns referred to in the claims may be assumed to encompass other numbers or symbols that are used for corresponding identification purposes in communication networks, except where otherwise specified or in cases in which the context would be inconsistent with such inclusion.

From the preceding description of various embodiments of the present invention, it is evident that the invention provides a method for efficient reuse of the assigned MINs between different systems. Although the invention has been described and illustrated in detail, it is to be clearly understood that the same is intended by way of illustration and example only and is not to be taken by way of limitation. Accordingly the spirit and scope of the invention are to be limited only by the terms of the appended claims and their equivalents.

What is claimed is:

1. A method for allocating mobile identification numbers (MINs) to a remote device, said method comprising:

communicating a commissioning request to a host system, the host system having an associated system identifier (SID);

selecting a permanent MIN from a database of available MINs associated with the host SID;

encoding the permanent MIN as a digit-by-digit difference with a reference MIN; and communicating the permanent MIN to the remote device.

2. A method in accordance with claim 1 wherein communicating a commissioning request comprises the step of communicating a unique serial number (S/N) associated with the remote device and an initial MIN to the host system.

3. A method in accordance with claim 2 further comprising the step of assigning the permanent MIN and the host SID to the S/N in a remote device database.

4. A method in accordance with claim 3 further comprising the step of modifying the database of available MINs to indicate that the permanent MIN is not available for assignment.

5. A method in accordance with claim 2 further comprising the step of selecting the initial MIN from a predetermined list of temporary MINs stored in a memory of the remote device.

6. A method in accordance with claim 5 wherein said selection is a random selection.

7. A method in accordance with claim 5 wherein said selection is dependent upon the unique S/N associated with the remote device.

8. A method in accordance with claim 2 further comprising the steps of:
retrieving an assigned MIN and an assigned SID associated with the S/N in an remote device database;
determining that a difference exists between the retrieved, assigned SID and the host SID; and
adding the retrieved, assigned MIN to a database of available MINs associated with the retrieved, assigned SID.

9. A method in accordance with claim 1 wherein communicating a permanent MIN comprises the step of communicating the digit-by-digit difference from the host to the remote device.

10. A method in accordance with claim 9 wherein communicating the digit-by-digit difference comprises the steps of:
encoding the digit-by-digit difference as one or more tuples, each tuple being indicative of a digit position and a difference in a digit in that position between a permanent MIN and the reference MIN; and
communicating the tuples to the remote device.

11. A method in accordance with claim 10 wherein communicating the tuples to the remote device comprises broadcasting, from the host system, one or more MINs from a reserved group of signaling MINs, wherein each of the signaling MINs corresponds to a predetermined tuple indicative of a digit position and a difference in a digit in that position between a permanent MIN and the reference MIN.

12. A method in accordance with claim 11 further comprising the step of analyzing, at the remote device, the broadcast of one or more MINs prior to a pause of a predetermined length to determine termination of the broadcast of digit-by-digit differences between the permanent MIN and the reference MIN.

13. A method in accordance with claim 9 further comprising the steps of:
decoding, at the remote device, the one or more tuples broadcast by the host system to determine the permanent MIN; and
communicating the decoded permanent MIN and the S/N to the host system for verification.

14. A method in accordance with claim 13 further comprising the steps of:
assigning the permanent MIN and the host SID to the S/N in an remote device database;
determining a discrepancy exists between the permanent MIN and the S/N as received for verification, and the host SID on one hand, and the assigned permanent MIN and the host SID in the remote device database that are assigned to the S/N as received on the other;
communicating an error signal to the remote device; and
communicating another commissioning request from the remote device to the host system.

15. A method in accordance with claim 1, further comprising the steps of:
broadcasting, from the host system, the host SID; and
determining, at the remote device, a difference between the SID that was broadcast and a stored SID in a memory of the remote device prior to said step of communicating the commissioning request.

16. A method in accordance with claim 1 wherein selecting a permanent MIN from a database of available MINs associated with the host SID comprises the step of selecting an odd or an even permanent MIN from the database of available MINs to balance numbers of previously assigned odd and even MINs.

17. A method in accordance with claim 16 wherein selecting an odd or an even permanent MIN comprises the step of analyzing the S/N in the commissioning request to determine whether to select an odd or an even MIN.

18. A method in accordance with claim 1 further comprising the steps of broadcasting, from the host system, a local switch number of a switch communicating with the host system communicates, and storing the local switch number in a memory of the remote device.

19. A method in accordance with claim 18 further comprising the step of determining a difference between a local switch number stored in the memory of the remote device and the local switch number broadcast by the host system; and wherein the commissioning request is communicated after said difference determining step.

20. A communication system for allocating mobile identification numbers (MINs), said communication system comprising:
a remote device including a memory; and
a host system having an associated system identifier (SID); and
a database of available MINs associated with said host SID;
wherein said remote device is configured to communicate a commissioning request to said host system, said host system is configured to respond to said commissioning request by communicating a permanent MIN to said remote system from said database of available MINs associated with said host SID, and to encode said permanent MIN as a digit-by-digit difference as compared to a reference MIN.

21. A communication system in accordance with claim 20 wherein said remote device is associated with a unique serial number (S/N) and an initial MIN, and said remote device is configured to communicate said unique serial number (S/N) associated with said remote device and said initial MIN to the host system.

22. A communication system in accordance with claim 21 further comprising a remote device database, and wherein said host system is configured to communicate said permanent MIN to said remote device database and said remote device database is configured to assign said permanent MIN and said host SID to said S/N in said remote device database.

23. A communication system in accordance with claim 22 wherein said host system is further configured to modify said database of available MINs to indicate that the permanent MIN is not available for assignment.

24. A communication system in accordance with claim 21 wherein said memory in said remote device contains a list of predetermined temporary MINs and said remote device is further configured to select said initial MIN from said predetermined list of temporary MINs.

25. A communication system in accordance with claim 21 further comprising:
   a remote device database including said S/N of said remote device and an assigned MIN and an assigned SID of said remote device;
   and further wherein said host system is configured to communicate said S/N and said host SID to said remote device database, and said remote device database is configured to retrieve said assigned MIN and said assigned SID associated with said S/N of said remote device, determine whether a difference exists between said retrieved, assigned SID and said host SID, and if so, add the retrieved, assigned MIN to a database of available MINs associated with the retrieved, assigned SID.

26. A communication system in accordance with claim 21 wherein said host system is further configured to broadcast said host SID, and wherein said remote device further comprises a memory for a stored SID, and said remote device is configured to determine whether a difference exists between said SID broadcast by said host system and said SID stored in said remote system's memory, and if said difference exists, to communicate said commissioning request.

27. A communication system in accordance with claim 20 wherein said host system is configured to communicate said permanent MIN by communicating said digit-by-digit difference to said remote device.

28. A communication system in accordance with claim 27 wherein said host system is configured to encode said digit-by-digit difference as one or more tuples, each tuple being indicative of a digit position and a difference in a digit in that position between said permanent MIN and said reference MIN;
   said communication system further comprising like tables of signaling MINs at both said host system and said remote device, each signaling MIN corresponding to a predetermined tuple indicative of a digit position and a difference in a digit in that position between a permanent MIN and said reference MIN,
   said host system also being configured to encode and broadcast said tuples as signaling MINs, and said remote device being configured to decode said broadcast signaling MINs as said permanent MIN.

29. A communication system in accordance with claim 28 wherein said remote unit is further configured to analyze, at the remote device, said broadcast of signaling MINs and to detect a pause of a predetermined length in said broadcast to determine a termination of said broadcast.

30. A communication system in accordance with claim 27 wherein said remote device is further configured to decode the one or more tuples broadcast by said host system to determine said permanent MIN and to communicate said decoded permanent MIN and said S/N to said host system for verification.

31. A communication system in accordance with claim 30 further comprising a remote device database, wherein said host system is configured to communicate said permanent MIN to said remote device database and said remote device database is configured to assign said permanent MIN and said host SID to said S/N in said remote device database;
   said remote device database configured to determine whether a discrepancy exists between (a) said permanent MIN and said S/N as received for verification, and said host SID, and (b) said assigned permanent MIN and said host SID that are assigned to said S/N in said remote device database, and to signal said host system of a discrepancy;
   said host system further configured to communicate an error signal to said remote device when said discrepancy is signaled, and said remote system being configured to communicate another commissioning request to said host system upon receiving said error signal.

32. A method for operating a remote device for communicating to a host system, said method comprising:
   communicating a commissioning request to a host system, the host system having an associated system identifier (SID);
   receiving tuples broadcast by the host system and indicative of a digit position and a digit difference between a permanent mobile identification number (MIN) and a reference MIN;
   decoding the received tuples to determine the permanent MIN;
   storing the permanent MIN in a memory of the remote device; and
   utilizing the permanent MIN to identify the remote device in communications with the host system.

33. A method in accordance with claim 32 wherein communicating a commissioning request comprises the step of communicating an initial MIN and a unique serial number (S/N) associated with the remote device to the host system.

34. A method in accordance with claim 33 further comprising the step of selecting the initial MIN from a predetermined list of temporary MINs stored in a memory of the remote device.

35. A method in accordance with claim 32 wherein receiving tuples broadcast by the host system comprises the steps of:
   receiving one or more tuples encoded as MINs from a reserved group of signaling MINs, wherein each of the signaling MINs corresponds to a predetermined tuple indicative of a digit position and a digit difference between a permanent MIN and the reference MIN; and
   decoding the received reference MINs as tuples.

36. A method in accordance with claim 35 further comprising the step of determining an end to the broadcast of tuples by the host system by waiting for a pause in the broadcast of tuples.

37. A remote device for communicating with a host system, said remote device having a memory and being configured to:
   communicate a commissioning request to a host system, the host system having an associated system identifier (SID);
   receive tuples broadcast by the host system that are indicative of a digit position and a difference in that digit position between a permanent MIN and a reference MIN stored in said memory;
   decode the received tuples to determine said permanent MIN;
   store the permanent MIN in the memory of the remote device;
   and thereafter use the permanent MIN stored in the memory to identify the remote device in communications with the host system.

38. A remote device in accordance with claim 37 wherein said remote device is further configured to communicate an initial MIN and a unique serial number (S/N) associated with said device to the host system in said commissioning request.

39. A remote device in accordance with claim 38 wherein said remote device further comprises memory in which is stored a list of predetermined temporary MINs, and said device is configured to select an initial MIN from said predetermined list of temporary MINs.

40. A remote device in accordance with claim 37 further comprising a memory indicative of a group of signaling MINs, wherein each of said signaling MINs corresponds to a predetermined tuple indicative of a digit position and a difference in a digit in that position between a permanent MIN and the reference MIN, and said device is configured to receive encoded tuples encoded as signaling MINs that are broadcast by the host system, and to decode said broadcast signaling MINs to determine and decode said received tuples.

41. A remote device in accordance with claim 40 further configured to analyze the broadcast of tuples by the host system to determine a pause signaling a tuple broadcast conclusion.

42. A method of operating a host system associated with a system identifier (SID) to communicate a permanent mobile identification number (MIN) to a remote device, comprising the steps of:
   receiving a commissioning request from a remote device;
   selecting a permanent MIN from a database of available MINs associated with the host system's associated SID;
   encoding the permanent MIN as a digit-by-digit difference with a reference MIN; and
   communicating the permanent MIN to the remote device.

43. A method in accordance with claim 42 wherein receiving a commission request comprises the step of receiving a unique serial number (SIN) associated with the remote device and an initial MIN.

44. A method in accordance with claim 43 further comprising the step of modifying the database of available MINs to indicate that the permanent MIN is not available for assignment.

45. A method in accordance with claim 42 wherein communicating the permanent MIN to the remote device comprises the step of communicating the digit-by-digit difference from the host system to the remote device.

46. A method for re-allocating previously allocated mobile identification numbers (MINs) comprising:
   storing a tabulation of MINs by cellular system identifiers (SIDs) in an available MIN database table;
   managing the available MIN database table with a host system;
   storing information on at least one individual remote device, the information including at least a currently assigned MIN, a last registered SID, an equipment serial number (ESN), and a last known mobile switching center in a remote device database table;
   managing the remote device database table with a host system;
   receiving information on a MIN, an ESN, and a SID with the host system;
   comparing the received information with the information in the remote device database table;
   erasing existing stored MIN and SID entries in the remote device database table and adding the erased information to the available MIN database table when the received SID information is different from the stored SID information; and
   preserving the existing MIN information when the received SID and the stored SID information is identical.

47. A method of compressing data representing an assigned mobile identification number (MIN) comprising:
   establishing a base MIN;
   assigning a MIN; and
   encoding the difference between the assigned MIN and the base MIN on a digit-by-digit basis using a tuple, with one position of the tuple representing a digit difference and another position of the tuple representing a position difference.

* * * * *

UNITED STATES PATENT AND TRADEMARK OFFICE
CERTIFICATE OF CORRECTION

PATENT NO. : 6,393,298 B1
DATED : May 21, 2002
INVENTOR(S) : Robert D. Fulton

It is certified that error appears in the above-identified patent and that said Letters Patent is hereby corrected as shown below:

<u>Column 13,</u>
Line 33, delete "(SIN)" insert therefor -- (S/N) --.

Signed and Sealed this

Fourteenth Day of October, 2003

JAMES E. ROGAN
*Director of the United States Patent and Trademark Office*